3,189,091
METHOD OF TREATING UNCONSOLIDATED WATER-CONTAINING WELL FORMATIONS
William G. Bearden and James W. Spurlock, Tulsa, Okla., assignors to Pan American Petroleum Corporation, Tulsa, Okla., a corporation of Delaware
No Drawing. Filed Aug. 27, 1962, Ser. No. 219,768
9 Claims. (Cl. 166—33)

This invention relates to a method of treating unconsolidated formations penetrated by a well to prevent the movement and sorting of particles near the well. More specifically, we have found that particle movement can be prevented without a major decrease in the permeability of the formation when the particles are bonded together with a pliant or elastic cementing material.

Many oil and gas wells produce from incompetent or unconsolidated formations. As fluids move from such formations into the well, the smaller particles of sand, clay and the like are carried into the well. The removal of these particles from the formation enables other larger particles to shift their positions. In some instances, these larger particles are also carried into the well whereas in others the shifting of the larger particles removed the support for additional smaller particles so that they could migrate toward the well. In this manner, the particles are sorted according to size which can result in the production of substantial quantities of sand and other solids along with the well fluids. Screens and gravel packs are sometimes placed opposite these unconsolidated zones to filter the solids out of the fluids moving toward the well. These filtering devices frequently become plugged following a comparatively short period of use owing to the continued shifting and sorting of the particles.

Various agents have been used to consolidate the sand and other loose particles into a rigid mass to prevent this movement. A common means used to evaluate these consolidating agents is on the basis of the compressive strength of the consolidated mass. This philosophy possibly was adopted on the premise that the treated formation should resemble a permeable, naturally consolidated formation. Unfortunately, the materials which have been used to accomplish this aim frequently produce a major loss in the permeability of the formation, i.e., the permeability of the formation frequently is decreased more than 90 percent when sufficient consolidating material is used to develope the desired compressive strength. Attempts to increase the permeability by flushing a greater portion of the consolidating agent from the pores to develop larger flow channels usually resulted in a poorly consolidated mass offering little or no improvement in sand control.

Accordingly, it is an object of our invention to inject a treating fluid into an incompetent formation to bind together the loose particles near the well. It is another object to prevent the transport of solids into the well by the fluids from the formation. A further object is to cement the formation particles together while retaining more than 10 percent of the original permeability.

These, as well as other objects, are accomplished by depositing a pliant or elastic material on the particles in the formation whereby they are cemented together in a soft or rubbery mass. Additionally, the cementing material is one which is activated or caused to deposit by water in the formation, producing a material which is insoluble in formation fluids. The cementing material is injected into the formation in a solution with a solvent which is miscible with both water and the organic petroleum residue near the well. When the particles are cemented together with an elastic material, the formation can yield a slight amount as fluids flow through without releasing particles. On the other hand, a formation consolidated with a rigid material such as a phenolic resin cannot yield without fracturing, thereby releasing sand grains.

We have found two types of cementing materials which are suitable for practicing our invention. One of these is a material which reacts chemically with water to produce a continuous, pliant or elastic coating on the sand. An example of this type of compound is an aromatic polyisocyanate such as toluene-2, 4-diisocyanate. This compound reacts with water to produce carbon dioxide and an amine. The amine then combines with two more isocyanate groups to produce a biuret. Further reaction of additional isocyanate groups produces the polymeric elastic material. The aromatic polyisocyanates may be combined with any of several aliphatic polyhydroxy compounds which are known to react with them in the presence of water to produce a rubbery polymer. Suitable polyhydroxy compounds are glycerine, ethylene glycol, the polyalkyleneether glycols such as polypropyleneether glycol, and fatty acid triglycerides such as castor oil. Also, other aromatic polyisocyanate compounds may be used as taught in the article by Temple C. Patton in Paint Industry Magazine, September 1959, and in the text by Bernard A. Dombrow, Polyurethanes, Reinhold, 1957. An isomeric mixture containing 80 percent toluene-2,4-diisocyanate and 20 percent toluene-2,6-diisocyanate is particularly suitable. The resins produced from these compounds are known as polyurethanes. The ratio of the polyisocyanate to the polyhydroxy compound must provide an excess of the isocyanate groups over the hydroxyl groups. The polyurethane-forming mixture is employed in a solution with a hydrophilic or water-soluble solvent such as acetone and methyl ethyl ketone. The concentration of the monomers in the solution should be from about 40 percent to about 60 percent by weight, preferably about 50 percent.

The other type of cementing material which can be used in practicing our invention is a solution of a pliant or elastic compound in a water-soluble solvent. A particularly suitable material is a solution of high impact polystyrene in acetone and methyl ethyl ketone. The so-called high impact polystyrenes are copolymers of styrene and one or more other monomers, which produce a pliant plastic. A pliant styrene copolymer containing up to 15 percent 1,3 butadiene is soluble in the water-soluble ketones. A solution containing from about 10 percent to about 30 percent of a high impact polystyrene in the water-soluble ketones can be used; however, we prefer to use a 20 percent solution. Although either acetone or methyl ethyl ketone can be used as a solvent for the polystyrene, a mixture of approximately equal volumes of each is preferred.

The water-soluble ketones such as acetone and methyl ethyl ketone are especially suitable for practicing our invention. These ketones are solvents for both the oil and water in the formation as well as for the cementing materials which we have found to be effective. Thus, the particles of the formation are wetted by the cementing material, whether they be oil-wet or water-wet. Additionally, the water in the formation will dissolve in the solvent to activate or otherwise cause the deposition of the cementing material.

In carrying out the method of our invention, the zone to be treated is isolated from the rest of the well. If, for example, the formation opposite perforations in the well casing is to be treated, packers may be set above and below those perforations with a tubing extending to the surface from the zone between the packers. Aqueous fluids in the well between the packers as well as any which might have entered the tubing should be flushed out before the cementing material is injected to avoid premature deposition of the cement. This may be accomplished by pumping about 1–5 barrels of a petroleum-liquid such as crude oil, kerosene, or the like, down the tubing ahead of the cementing material to inject the petroleum liquid into the incompetent formation. A quantity of cementing material sufficient to consolidate the formation for a distance between one and two feet surrounding each perforation is preferable. Since the cementing material coats the formation particles without filling the interstices between the particles, a volume of cementing material equal to about one-half the pore volume of the formation to be consolidated is usually adequate. Laboratory studies have shown the consolidating material fills a substantially spherical section of the sand body with the center of the sphere at the perforation when the solution is displaced through a perforation. From about one to about five gallons of the cementing material may be injected into each perforation in a recently perforated interval where there has been little opportunity for movement of the formation particles. As much as one barrel of cementing solution may be used for each perforation where there has been considerable movement as evidenced by the presence of sand in the produced fluids. The cementing material is displaced down the tubing and into the formation with a nonaqueous fluid such as kerosene. Upon reaching the formation, the kerosene provides an overflush to remove the cementing solution from the interstices of the formation, leaving a thin layer coating the particles before there has been a substantial deposition of the cement from the solution. Owing to the hydrophilic property of the cementing solution, the water in the formation will be absorbed in the solution and produce precipitation of the cement. In the case of a cementing material such as the polyisocyanates, reaction occures between some of the water in the formation and the injected polyisocyanate to produce the elastic, rubbery binder which coats and binds the particles. Similarly, the solution of high impact polystyrene in water-soluble ketones absorbs the water in the formation. The resulting dilution of ketone solvent causes precipitation of the polymer onto the solid surfaces. The well should be closed in with the kerosene in the interstices for approximately 24 hours to allow the precipitation of the cement on the surfaces of the foramtion particles. When the well is returned to production, the residual cementing solution, diluted solvent, and the like will return to the well in advance of the reservoir fluids.

A series of laboratory tests were made to compare the method of our invention with those of the prior art. In these tests, a Hassler tube was packed with loose sand taken from an oil-bearing formation and the pore volume of the resulting cell determined. The cell was first saturated with brine, then flushed with oil to the irreducible minimum brine saturation. The sand pack was then treated with one of the consolidating agents. The results of these tests are summarized in Table I.

From the above, it can be seen that the phenolic resin will not wet the sand unless the water and wax are removed with an acetone preflush. Even then the kerosene overflush is unable to clear the interstices and restore sufficient permeability to the sand pack. Sodium silicate solution produced a good bond between the sand grains following a preflush with diesel oil containing a surfactant; however, most of the permeability of the pack was lost. The problem here is thought to be the result of the two solution system, i.e., the sodium silicate is precipitated by a subsequently injected calcium chloride solution rather than a connate fluid. The solution of high impact polystyrene in water-soluble ketones produced a good bond with the sand and reduced the permeability of the pack by 50% or less of the original permeability. The consolidated pack was pliable and somewhat elastic so that some deformation could occur without releasing the sand particles. The polyurethane resin obtained from the castor oil and toluene diisocyanate mixture performed similarly to the polystyrene solution in that it produced a permeable, elastic mass with a good bond between the sand grains. The data further show the effect of increased volume of overflush in restoring the permeability of the pack.

From the foregoing, it may be concluded that a successful treating method which bonds the sand grains and reduces the original permeability of the pack less than 90 percent must utilize a solution which is miscible with both the oil and water in the formation and which is caused to solidify and cement the sand grains by the water in the formation rather than an extraneous fluid. Additionally, the bonding agent should be one which is pliant or elastic so that the consolidated formation can be deformed without rupturing. Other pliant cementing materials such as cellulose nitrate and cellulose acetate which are soluble in the water-soluble ketones may be used in practicing our invention. Some of the nylon or polyamide resins have sufficient flexibility and suitable solvent properties for use in consolidating formations. For example, polyhexamethylene adipamide modified by reaction with formaldehyde can be dissolved in 80% aqueous ethanol and used according to our invention. An alcohol-soluble polyamide suitable for this process is available commercially as Zytel 61.

Our invention has been described as it may be practiced using a string of tubing in the well. Another method which has been found to reduce the time and expense of the treatment involves the use of a wire line dump bailer. With the bailer suspended at the proper level in the well, packers are set to isolate the perforations to be treated. Thereafter, the solution of cementing material followed by the overflush liquid is displaced from the bailer into the formation. Wire line dump bailer services suitable for this method of treating the formation are commercially available. This method may be used either to workover an old well or in completing a new well. In

*Table I*

| Plastic cement | Preflush, pore vol. | Cement solution pore vol. | Overflush, pore vol. kerosene | Permeability reduction, percent | Remarks |
| --- | --- | --- | --- | --- | --- |
| Catalyzed phenolformaldehyde | None | 0.5 | 0.5 | 99.3 | No bond. |
|  | 1.0 Acetone | 0.25 | 1.0 | 99.0 | Good bond. |
| 20% sodium silicate | 1.0 diesel oil [2] | 1.0 | [1] 1.5 | 97.0 | Do. |
| Polystyrene, 20% | None | 0.5 | 0.5 | 38 | Good bond, elastic. |
| Acetone, 35%; methyl ethyl ketone, 45%. | None | 0.5 | 10 | 50 | Do. |
| Isometric toluenediisocyanate mixture, 50%; Castor oil, 50%. | None | 0.5 | 0.25 | 84 | Do. |
|  |  | 0.5 | 0.5 | 75 | Do. |
|  |  | 0.5 | 1.0 | 55 | Do. |
|  |  | 0.5 | 2.0 | 41 | Do. |

[1] Also flushed with 1 pore volume of 20% $CaCl_2$ solution to precipitate the silicate.
[2] Diesel oil containing 1 percent surfactant to produce water-wetness in core.

We claim:

1. A method of treating a water-containing incompetent formation penetrated by a well to prevent movement and sorting of particles therein as fluid flows from said formation into said well comprising:

injecting a solution of a cementing material into said formation, said solution comprising a hydrophilic solvent and a material which deposits a pliant solid on particles of said formation when said solution mixes with water in said formation, then flushing said formation with a fluid to displace a portion of said solution from the interstices between the solid particles in said formation near said well, maintaining said flush fluid in the interstices of said formation while said pliant solid deposits on said particles, then placing said well on production and flowing formation fluids through the resulting permeable formation and into said well.

2. The method of claim 1 wherein said cementing solution comprises a mixture of compounds which react in the presence of water to produce a pliant cementing material, said mixture being in solution with a solvent for both water and petroleum residues.

3. The method of claim 2 wherein said cementing solution consists of polyurethane-forming monomers in a solution containing at least one ketone selected from the group consisting of acetone and methyl ethyl ketone, the concentration of said monomers in said ketone being between about 40 percent and about 60 percent by weight.

4. The method of claim 1 wherein said cementing solution comprises a solvent for both water and petroleum residues, and a cementing material which deposits on the particles of said formation as a pliant solid upon the dilution of said solvent with water.

5. The method of claim 4 wherein said solution consists of from 10 percent to 30 percent by weight of high impact polystyrene in a solvent containing at least one ketone selected from the group consisting of acetone and methyl ethyl ketone.

6. The method of claim 5 wherein said solution contains approximately equal volumes of acetone and methyl ethyl ketone.

7. The method of claim 4 wherein said solution consists of from 10 percent to 20 percent by weight of a flexible polyamide resin in ethanol containing approximately 20 percent by weight of water.

8. The method of claim 1 including the step of injecting a petroleum liquid into said incompetent formation in advance of said solution of cementing material.

9. The method of claim 1 wherein said solution is injected into said formation through perforated well casing opposite said formation.

References Cited by the Examiner

UNITED STATES PATENTS

| | | | |
|---|---|---|---|
| 2,770,306 | 11/56 | Clark | 166—33 |
| 2,799,341 | 7/57 | Maly | 166—29 X |
| 2,867,278 | 1/59 | Mallory et al. | 166—33 |
| 2,889,883 | 6/59 | Santora | 166—33 |
| 3,011,547 | 12/61 | Holbert et al. | 166—33 |
| 3,070,160 | 12/62 | Reistle | 166—33 X |
| 3,097,692 | 7/63 | Holland et al. | 166—33 |

CHARLES E. O'CONNELL, *Primary Examiner.*